United States Patent Office 3,088,930
Patented May 7, 1963

3,088,930
CURED CHLORINATED ETHYLENE-HIGHER ALPHA OLEFIN COPOLYMER AND CURING AGENTS THEREFOR
William P. Cain, Linden and Henry S. Makowski, Carteret, N.J., assignors to Esso Research and Engineering Company, a corporation of Delaware
No Drawing. Filed May 29, 1959, Ser. No. 816,708
4 Claims. (Cl. 260—41)

The present invention relates to the preparation of synthetic rubber and more particularly to the curing of chlorinated rubbery amorphous copolymers to synthetic rubbers.

The low-pressure polymerization and copolymerization of alpha olefins with catalyst systems made up of a partially reduced heavy transition metal halide and a reducing metal-containing compound to high density, high molecular weight, solid, relatively linear products is now well-known, see e.g. Belgian Patent 533,362, "Chemical and Engineering News," April 8, 1957, pages 12 through 16, and "Petroleum Refiner," December 1956, pages 191 through 196.

This application is a continuation-in-part of copending application, Serial No. 738,940, filed June 2, 1958. The preparation of synthetic rubber from chlorinated rubbery amorphous copolymers of ethylene and a higher alpha olefin has been disclosed and claimed in that application. That application describes the use of curing systems for the chlorinated copolymers which utilize a combination of (1) a curing agent which cures through chlorine groups such as metal oxides and (2) a curing agent which cures through unsaturation, such as sulfur.

It has now been found that chlorinated rubbery amorphous copolymers of ethylene and higher alpha olefins can be cured with a group of superior curing agents which do not employ elemental sulfur. Sulfur often imparts undesirable properties to the resulting vulcanizates, namely, "blooming" on the vulcanizate surface, undesirable flexing properties, and inferior aging properties. In accordance with the invention, a combination of a curing agent which cures through chlorine groups such as metal oxides, in combination with certain superior curing agents which cure through unsaturation are advantageously employed. The superior curing agents, which cure through unsaturation, are selected from the following:

(1) Thiuramsulfides having the following general structure:

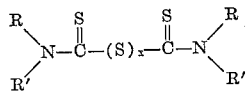

wherein x is 1, 2, or 4; R and R' can be any alkyl, aryl, alkylaryl, arylarlkyl, or cycloalkyl group. R and R' can be the same or different. R and R' can be cyclic such as in dipentamethylene thiuram monosulfide:

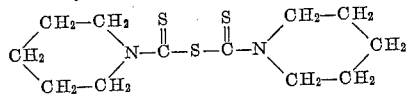

Thiuram sulfides having the above general structure include tetramethylthiuram monosulfide; tetraethyl thiuram disulfide; dipentamethylene thiuram tetrasulfide; and N,N'-dimethyl-N,N'-diphenyl thiuram disulfide.

(2) 2-mercaptobenzothiazole and its derivatives. 2-mercaptobenzothiazole has the following structure:

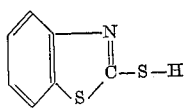

Derivatives of this compound can be made by substituting various groups for the hydrogen atom of the mercaptan group. Hence, the hydrogen can be replaced by metals, such as potassium, sodium, zinc, or copper, or the hydrogen may be replaced by alkyl or aryl groups. An example of an aryl group replacing the hydrogen is 2-(2,4-dinitrophenylthio)benzothiazole.

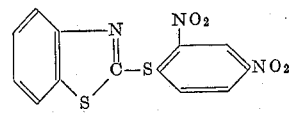

The hydrogen may also be replaced by the following group:

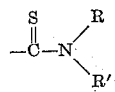

wherein R and R' are the same or different and are any alkyl, aryl, or cycloalkyl group such as (N,N-diethylthiocarbamyl)-2-mercaptobenzothiazole:

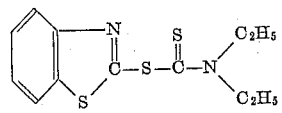

Also, the hydrogen can be replaced by a trivalent nitrogen group such as in N,N-diethyl-2-benzothiazolesulphenamide:

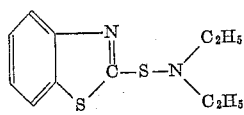

Other trivalent nitrogen groups include:

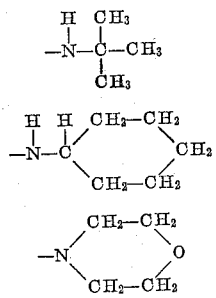

The hydrogen may also be replaced by another 2-mercaptobenzothiazole group such as di-2-benzothiazyl disulfide:

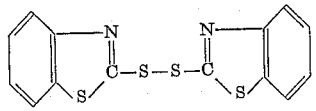

(3) Metal and amine salts of dialkyl dithiocarbamic acids having the general structure:

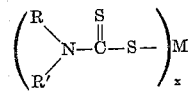

where R and R' are alkyl or cycloalkyl groups, e.g. methyl, ethyl, or butyl groups. R and R' may or may not be identical. R and R' can also be connected in a cyclic structure, such as sodium pentamethylene dithiocarbamate:

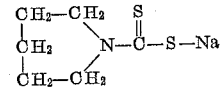

M in the general structure is any metal or quaternary nitrogen group. Metals such as potassium, sodium, lead, copper, selenium, etc. can be used. Quaternary nitrogen groups include the ammonium ion, dimethylammonium ion, piperidinium ion, etc. $x$ is a small whole number equal to the valence of M.

Examples of these dialkyl dithiocarbamates are: sodium dimethyl dithiocarbamate, dimethylammonium dimethyl dithiocarbamate, zinc diethyl dithiocarbamate, selenium dibutyl dithiocarbamate, N-N-dimethylcyclohexyl ammonium dibutyl dithiocarbamate, piperidinium pentamethylene dithiocarbamate, etc.

The curing agents which cure through chlorine groups which are used in combination with one or more of the above curing agents include metal oxides, metal salts and metal powders. In general, the metal components of the metal salts, metal oxides and metal powders are chosen from groups IIA and IIB of the periodic table and copper, and iron. Particularly useful are the metal oxides, sulfides, nitrates, phosphates, sulfates, and organic acid salts of zinc, cadmium, manganese, iron and lead.

The chlorinated copolymers cured by the curing agents of the invention are copolymers containing 15 to 85 mol percent ethylene and 85 to 15 mol percent of a higher alpha olefin containing from 3 to 8 carbon atoms such as propylene, butene-1, heptene-1, and the like which contain from 1 to 30 wt. percent, preferably 2 to 15 wt. percent chlorine; have a crystallinity of less than 25%, usually less than 10%; have softening points of less than 25° C.; tensile strengths of from 50 to 1000 p.s.i., preferably 50 to 500 p.s.i.; an apparent modulus of elasticity at −50° C. of from 10,000 to 400,000 p.s.i., preferably from 50,000 to 200,000 p.s.i., and more preferably from 60,000 to 150,000 p.s.i.; and intrinsic viscosities in tetralin at 125° C. at a concentration of one gram per liter of from 0.4 to 3.5, preferably 0.9 to 2.5. The chlorinated copolymers also contain unsaturation as evidenced by iodine numbers of up to 30, infra-red spectra, and the fact that partial curing can be effected with the use of sulfur as the curing agent.

An advantageous process for preparing the chlorinated copolymers of the invention is described in copending application Serial No. 725,513 filed April 1, 1958, by W. P. Cain et al. which is incorporated herein by reference. In particular, chlorinated copolymers can be prepared according to the process of this copending application by polymerizing ethylene and a higher alpha olefin in contact with a low-pressure polymerization catalyst in an inert diluent, preferably inactivating or removing the catalyst, and then treating the reaction mixture with a chlorinating agent at a temperature in the range of 40 to 150° C. The resulting chlorinated copolymer is then isolated from the chlorination reaction mixture.

The reaction between the chlorinated copolymer and the curing agent is carried out by mixing the chlorinated copolymer and the curing agent on a rubber mill and heating the resulting mixture in a standard rubber press in the range of from 225° F. to 350° F., preferably 280° F. to 315° F. and more preferably about 310° F. until curing is effected. Fillers, antioxidants, and oils are added with the curing agent mixture as desired. The mixing is carried out on a rubber mill followed by heating the resulting mixture to reaction temperature in a standard rubber press or other conventional rubber curing equipment. The mixing can also be carried out in other rubber compounding equipment, such as Banbury mixers and kneaders.

The cured chlorinated copolymers of the invention have excellent mechanical properties, dynamic properties, and ozone resistance. They are useful wherever a good general purpose elastomer is required, such as in tires, hoses, gaskets and the like. Their use in tires is particularly advantageous since the synthetic rubber of the invention is tough and yet resilient and ozone resistant.

From 0.5 to 15, preferably from 2 to 8 parts of chlorine group curing agent is used per 100 parts of chlorinated copolymer and from 0.5 to 10 parts, preferably from 1 to 7 parts of the unsaturation curing agent of the invention is used per 100 parts of chlorinated copolymer.

Fillers such as carbon blacks, silica, mica and others of like nature can be added to the curing mixtures in amounts of from 5 to 150 parts, preferably about 50 parts. Any type of carbon black can be used, such as channel blacks, furnace blacks, acetylene blacks, lamp blacks, and the like.

Antioxidants can also be added when desired, such as for example secondary aromatic amines and phenols, e.g. phenyl-beta-naphthylamine, N,N'-di-beta-naphthyl-p-phenylene-diamines, aldol-alpha-naphthylamine, 2,2,4-trimethyl-1,2-dihydroquinoline, hydroquinone monobenzyl ether, and 2,2'-methylene-bis(4-methyl-6-tert.butyl-phenol). From 0.01 to 10%, preferably 0.1 to 2% of antioxidant can be used.

Oils derived from coal tar, pine tar and/or petroleum can be added to the curing mixture if desired and from 2 to 30 parts, preferably 5 to 15 parts by weight of oil per 100 parts of chlorinated copolymer can be employed to serve as inexpensive fillers, softening agents or tackifying agents.

The invention will be understood more clearly in the following examples.

EXAMPLES I–IV

A chlorinated ethylene-propylene copolymer was prepared by polymerizing a 50–50 volume mixture of ethylene-propylene using as catalyst $AlEt_3/TiCl_3$—0.2$AlCl_3$, inactivating the catalyst with water after the reaction, and then chlorinating the resulting mixture to obtain the chlorinated ethylene-propylene copolymer. The chlorinated copolymer contained 6.7% chlorine, and had an intrinsic viscosity of 1.43 (in tetralin at 125° C.). The chlorinated copolymer was divided into portions and each portion compounded according to the following recipes given in Table I below.

*Table I*

| Example | I | II | III | IV |
|---|---|---|---|---|
| Polymer, parts by wt. | 100 | 100 | 100 | 100 |
| Semi-reinforcing Furnace Black | 50 | 50 | 50 | 50 |
| Zinc Oxide | 5 | 5 | 5 | 5 |
| Stearic Acid | 1 | 1 | 1 | 1 |
| Zinc diethyl dithiocarbamate | | 3 | | |
| Selenium diethyl dithiocarbamate | | | 3 | |
| Piperidinium pentamethylene dithiocarbamate | | | | 3 |

All stocks were cured for 15', 30', 45', and 60' at 306° F. Tensile strengths and elongations were obtained on each vulcanizate. The following cure data show that the dithiocarbamate cures are much more effective than those containing zinc oxide only (Example I).

*Table II*

| | Example | | | |
|---|---|---|---|---|
| | I | II | III | IV |
| 15'/306° F. Cure: | | | | |
| Tensile Strength, p.s.i. | 580 | 1,510 | 1,860 | 1,720 |
| Elongation, Percent | 420 | 460 | 450 | 440 |
| 30'/306° F. Cure: | | | | |
| Tensile Strength, p.s.i. | 670 | 1,690 | 1,960 | 2,000 |
| Elongation, Percent | 450 | 400 | 410 | 410 |
| 45'/306° F. Cure: | | | | |
| Tensile Strength, p.s.i. | 670 | 1,710 | 1,960 | 2,050 |
| Elongation, Percent | 435 | 335 | 380 | 365 |
| 60'/306° F. Cure: | | | | |
| Tensile Strength, p.s.i. | 730 | 1,760 | 1,920 | 2,100 |
| Elongation, Percent | 440 | 325 | 350 | 370 |

It can be seen from the above Table II that Examples II–IV, wherein the chlorinated copolymer was cured with a mixture containing a dithiocarbamate, produced a synthetic rubber having good tensile properties.

EXAMPLES V-VII

Portions of the chlorinated ethylene-propylene copolymer of Example I were compounded according to the recipes given in Table III below.

Table III

| Example | V | VI | VII |
|---|---|---|---|
| Polymer, parts by wt | 100 | 100 | 100 |
| Semi-reinforcing furnace black | 50 | 50 | 50 |
| Zinc Oxide | 5 | 5 | 5 |
| Stearic Acid | 1 | 1 | 1 |
| Tetramethyl thiuram disulfide | -------- | 3 | -------- |
| Tetramethyl thiuram monosulfide | -------- | -------- | 3 |

All stocks were cured for 15′, 30′, 45′, and 60′ at 306° F. Tensile strengths and elongations were obtained on each vulcanizate. The following cure data show the thiuram sulfide cures to be much more effective than those containing zinc oxide only (Example V).

Table IV

| Example | V | VI | VII |
|---|---|---|---|
| 15′/306° F. Cure: | | | |
| Tensile Strength, p.s.i | 580 | 1,710 | 1,200 |
| Elongation, percent | 420 | 450 | 410 |
| 30′/306° F. Cure: | | | |
| Tensile Strength, p.s.i | 670 | 1,810 | 1,400 |
| Elongation, percent | 450 | 430 | 390 |
| 45′/306° F. Cure: | | | |
| Tensile Strength, p.s.i | 670 | 1,770 | 1,430 |
| Elongation, percent | 435 | 400 | 370 |
| 60′/306° F. Cure: | | | |
| Tensile Strength, p.s.i | 730 | 1,820 | 1,470 |
| Elongation, percent | 440 | 390 | 370 |

EXAMPLES VIII-XI

Portions of the chlorinated ethylene-propylene copolymer of Example I were compounded according to the recipes given in Table V below.

Table V

| Example | VIII | IX | X | XI |
|---|---|---|---|---|
| Polymer, parts by wt | 100 | 100 | 100 | 100 |
| Semi-reinforcing furnace black | 50 | 50 | 50 | 50 |
| Zinc Oxide | 5 | 5 | 5 | 5 |
| Stearic Acid | 1 | 1 | 1 | 1 |
| Di-2-benzothiazyl disulfide | ----- | 3 | ----- | ----- |
| 2-Mercaptobenzothiazole | ----- | ----- | 3 | ----- |
| N-cyclohexyl-2-benzothiazole sulphenamide | ----- | ----- | ----- | 3 |

All stocks were cured for 15′, 30′, 45′, and 60′ at 306° F. Tensile strengths and elongations were obtained on each vulcanizate. The following cure data show the 2-mercaptobenzothiazole type cures to be much more effective than those containing zinc oxide only (Example VIII).

Table VI

| Example | VIII | IX | X | XI |
|---|---|---|---|---|
| 15′/306° F. Cure: | | | | |
| Tensile Strength, p.s.i | 580 | 1,100 | 1,390 | 190 |
| Elongation, percent | 420 | 430 | 490 | 830 |
| 30′/306° F. Cure: | | | | |
| Tensile Strength, p.s.i | 670 | 1,250 | 1,520 | 390 |
| Elongation, percent | 450 | 410 | 435 | 620 |
| 45′/306° F. Cure: | | | | |
| Tensile Strength, p.s.i | 670 | 1,380 | 1,850 | 900 |
| Elongation, percent | 435 | 390 | 400 | 470 |
| 60′/306° F. Cure: | | | | |
| Tensile Strength, p.s.i | 730 | 1,670 | 1,770 | 1,150 |
| Elongation, percent | 440 | 370 | 310 | 440 |

It can be seen from the above tables that synthetic rubbers of good mechanical properties can be prepared by using the curing systems of the invention without employing sulfur. It is to be noted that similar results and advantages can be obtained with the corresponding brominated copolymers.

Modifications of the above process of the invention can be made by those skilled in the art without departing from the spirit and scope of the invention.

What is claimed is:

1. A cured chlorinated low pressure copolymer having an olefin content of 15 to 85 mol percent ethylene and 85 to 15 mol percent of an alpha olefin containing from 3 to 8 carbon atoms and a chlorine content of from 2 to 15 wt. percent, the copolymer itself having been prepared with a catalyst of a reduced heavy transition metal halide and a reducing metal-containing compound, and the chlorinated copolymer being characterized in having before curing (a) a crystallinity of less than 25%; (b) a softening point of less than 25° C.; (c) a tensile strength of from 50 to 1000 p.s.i.; (d) an apparent modulus of elasticity at −50° C. of from 10,000 to 400,000 p.s.i., and (e) an intrinsic viscosity in tetralin at 125° C. at a concentration of one gram per liter of 0.4 to 3.5; said curing being effected with a curing mixture consisting essentially of (1) from 0.5 to 15 parts of a metal-containing substance selected from the group consisting of zinc, cadmium, manganese, iron, copper and lead inorganic salts, oxides and metal powders and (2) from 0.5 to 10 parts of a curing agent which consists essentially of a dialkyl dithiocarbamic acid salt, said parts being based on 100 parts by weight of chlorinated copolymer.

2. The composition of matter of claim 1 wherein said alpha olefin containing 3 to 8 carbon atoms is propylene.

3. The composition of matter of claim 1 wherein said curing mixture also contains from 5 to 150 parts of inert filler.

4. The composition of matter of claim 1 wherein from 2 to 8 parts of the metal-containing substance is used and from 1 to 7 parts of said curing agent is used per 100 parts of chlorinated copolymer.

References Cited in the file of this patent

UNITED STATES PATENTS

| | | |
|---|---|---|
| 2,416,069 | Scott | Feb. 18, 1947 |
| 2,850,490 | Canterino et al. | Sept. 2, 1958 |
| 2,920,062 | McFarland | Jan. 5, 1960 |